May 21, 1968  E. C. BRAINARD II, ET AL  3,384,897
HISTOGRAM CURRENT METER
Filed Feb. 3, 1966

INVENTORS
EDWARD C. BRAINARD, II
ROBERT L. SUNDBLAD
BY Kenway, Jenney + Hildreth
ATTORNEYS

United States Patent Office 3,384,897
Patented May 21, 1968

3,384,897
HISTOGRAM CURRENT METER
Edward C. Brainard II, and Robert L. Sundblad, Marion, Mass., assignors to Braincon Corporation, Marion, Mass., a corporation of Massachusetts
Filed Feb. 3, 1966, Ser. No. 524,921
13 Claims. (Cl. 346—8)

ABSTRACT OF THE DISCLOSURE

An instrument for providing a histographic film record of the amplitude of the output signal from data sensors for a period of time where the data sensor has an output indicating member which changes position mechanically to indicate the magnitude of the output. The indicating member is made radiative and a film is arranged to be exposed a sufficient time to show that the film has an image of both the position and the change of position of the member during the measurement time. By using a film which has a linear characteristic of change of density with exposure duration, the resulting trace can indicate not only the change of position but the rate of change of position of the indicating member.

---

Our invention relates to apparatus for generating and recording the amplitude of the output of data sensors as a function of time. In particular, it relates to apparatus for generating and recording time-amplitude records on photographic film of the amplitude and direction of motion of data sensors over a sustained period of time and is particularly useful in connection with oceanographic measurements.

The recording of oceanographic information, such as current velocity and direction, poses special problems not ordinarily encountered in other fields. The recording instruments are required to operate in a hostile environment and must be capable of sustained operation for extended periods of time. Since such instruments must contain their own power supply to drive the particular recording means used, it is necessary, where large amounts of informaiton are to be recorded, to insure that the recording is performed at maximum efficiency.

Prior film recording devices formed a single image of the data sensor output indicators on a single segment of film; the exposure time was of relatively short duration and the image thus corresponded to the instantaneous positions of the output indicators at a given point in time. When a large number of closely spaced data points during a given time interval was desired, it was necessary to expose a single film frame for each set of data points, thus rapidly exhausting the limited film supply and limiting the time during which the recording instrument can operate without reloading. In situations in which the data being recorded varies periodically and slowly during the period of interest, sampling techniques may be used to reduce the number of film records necessary to characterize the data. Such techniques, however, suppress individual variations that may occur in the data during the sampling interval. Thus in recording techniques of the type described above in which a film record characterized by short exposure durations is utilized to record the data, a severe compromise must be effected between the desire for a number of data points sufficient to accurately characterize the behavior of the data throughout a given time interval and the desire for an extended period of recording time with a limited film supply.

We have found that an improved recording apparatus which obviates many of the disadvantages of present instruments, such as those described above may be formed by focusing a film-loaded camera on the output indicators of one or more data sensors and exposing the film to the indicators for a substantial period of time and in particular, for a period of time which is substantially greater than that required to form an image on the film. The film-record thus formed during a single exposure provides a time history of the movement of the indicators during the exposure duration. By utilizing a film which possesses a linear relationship between the density of the exposed portion of the film and the exposure duration, the length of time during which a given data sensor occupied a particular position may also be determined directly from the film record.

The recording technique of our invention is particularly applicable to the measurement of oceanographic parameters due to its capability of recording a large amount of information on a single frame of film. Among the oceanographic parameters which it is desired to measure, current speed and current direction are two of those most frequently desired. Present techniques for measuring current direction utilize a vane mounted outside the instrument case and capable of rotation about a pivot so as to freely align itself with the direction of current flow. The motion of this vane is transmitted to the interior of the instrument case by either a mechanical or a magnetic linkage; the motion is then recorded in some desired fashion within the instrument. The vane follower mechanisms used to provide the linkage are often delicate in nature and, due to the friction of such systems, are generally insensitive to current direction at very low current velocities. Accordingly, we have provided a simple and improved current direction indicator for use with the recording technique of our invention. Briefly, this indicator comprises a reference marker positioned adjacent a liquid-compass inside the instrument case and a large-area vane attached to the outside of the case and having a fixed position with respect to the reference marker. The vane orients the case and the marker in the direction of current flow such that the relative position of the marker with respect to a given compass heading completely determines the direction of current flow.

The measurement of current speed is usually performed by means of a rotor also mounted outside the instrument case and coupled either mechanically or magnetically to revolution-counting mechanisms inside the case. Typical current speed indicators utilize mechanical counters to record the number of revolutions of the rotor within a given time interval to provide an indication of the current speed. The digital output of the mechanical counters is then photographed directly by a camera mounted within the instrument. Such counters are expensive, especially if they are specially calibrated to provide an output reading in the physical units corresponding to the variable to be measured (e.g. knots, for current speed). Further, if the current speed is sampled at relatively short time intervals, a large number of readings which vary only slightly from each other will be obtained; the information contained in these readings is thus highly redundant and wasteful of the limited film supply. If, on the other hand, a relatively long period is selected for the current velocity sampling time, it will be impossible to tell from this method whether or not the current velocity varied substantially during the sampling interval, since only the total number of revolutions of the current rotor will be indicated. Accordingly, we have also provided an improved current meter for use with the recording technique of our invention. The current meter utilizes a Savonius rotor coupled through a reducing-type gear box to an indicator arm of relatively large radius which is mounted for rotational movement in the plane of a camera; the length of arc through which the indicator rotates during a given exposure duration is directly proportional to the current speed. We have also provided a tilt correction indicator to measure the angle at which the current meter is oriented with respect to the current flow in order that errors arising from this angular tilt may subsequently be corrected.

Accordingly, it is an object of our invention to provide apparatus for generating a time-amplitude record of the outputs of data sensors in which a continuous record of the output indications of the sensors is generated during a time interval substantially greater than that required to form an image on the film. Another object of our invention is to provide an improved oceanographic instrument for measuring current speed and direction in which the behavior of the output indications of the data sensors over a substantial period of time may be recorded on a single frame of film. Yet another object of our invention is to provide an improved current velocity sensor for use with our invention. Still another object of our invention is to provide an improved current direction sensor for use with our invention.

Other and further objects and features of our invention will appear below in the following detailed description of a preferred embodiment thereof which has been selected for purposes of illustration and which is shown in the accompanying drawings in which.

In accordance with our invention, we provide appartus for generating time-amplitude records of the output readings of one or more data sensors having output indicating means capable of mechanical movement. A film-loaded camera focused on the data sensors is provided with film-advance mechanism to generate a series of photographic records of the data sensor output indicators, each record being formed by exposing the film to the output indicators for a period of time which is substantially greater than that required to form an image on the film. During the time that each record is being generated, the movement of the output indicators provides on the film a trace of the amplitude and direction of the excursion of the indicators from a given reference position. By selecting for use in accordance with our invention a film which is characterized by a substantially linear exposure density/exposure time relationship over the interval during which the film is to be exposed, the length of time during which an indicator was at any given portion of the film may be determined. Thus, each frame of the film provides a complete time history of the amplitude of one or more output indicators over a substantial period of time. In order to measure current speed and current direction, a current velocity indicator comprising a current sensing rotor whose output is fed through a reduction gear box to the indicator is photographed by the camera to form a trace on the film whose length is directly proportional to the current speed. The current direction is determined by reference to a marker whose position is fixed with respect to the camera and which is coordinated with an external vane of large area which orients the reference marker with respect to the current flow.

Figure 1:
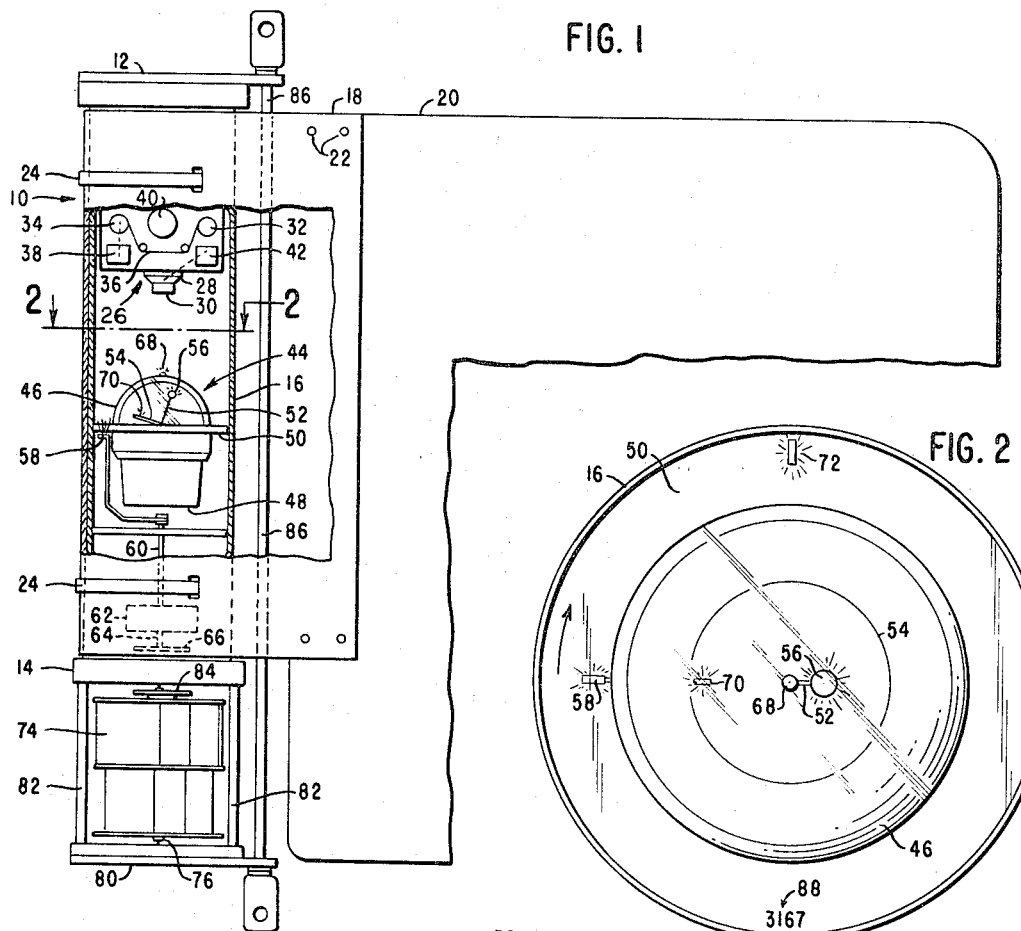
FIGURE 1 is a side view, partially in section, of the apparatus of our invention as embodied in a meter which measures current speed and current direction.

FIGURE 1 is a side view of the apparatus of our invention, partially in section, as embodied in an instrument for measuring and recording current velocity and current direction. A cylindrical instrument case 10 having end walls 12 and 14 and cylindrical side 16 has attached thereto a fairing plate 18 which extends around the instrument and which is secured to a vane 20 at the rear portion of the instrument casing by means of bolts 22. The fairing plate 18 is firmly secured to the case 10 by means of straps 24 which are fitted around the case at the rear portion thereof and which extend through an opening in the side wall of the fairing plate and around the front portion of the plate to a corresponding opening in the wall of the plate on the distant side of the case 10. A camera 26 is mounted inside the case and at the upper end thereof; the camera may have a mechanical shutter 28 and a lens 30. A film supply spool 32 and a take-up spool 34 are mounted inside the camera and cause a strip of film 36 to be fed past the shutter 28 under control of the film advance mechanism 38 and the timing clock 40. A shutter control mechanism 42 may be provided in conjunction with the clock 40 to control the opening of the shutter 28 and the length of time for which it is maintained open. Since the case 10 is completely closed and shielded from all external light sources, the shutter 28 and the shutter control mechanism 42 may be omitted if desired. This will be made more apparent in connection with the detailed description of operation which follows. The film advance mechanism 38, the clock 40, and the shutter control mechanism 42 are known elements and are therefore shown in block diagram form only. A suitable construction for the film advance and clock timing mechanism is shown in U.S. Patent No. 3,183,717, issued May 18, 1965, to E. C. Brainard II, which is also assigned to the assignee of the present invention.

Mounted directly below the camera 26 and within its field of view is a compass 44 having a hemispherical dome 46 attached to a casing 48. The compass is seated in a translucent plexiglass ring 50 which is rigidly attached to the side wall 16 of the instrument case; alternatively, the compass may be mounted on standoffs (not shown) within the case in conventional fashion. The compass 44 is of the fluid-damped variety and may be of the type illustrated in U.S. Patent No. 2,428,346, issued Sept. 30, 1947, to W. G. White, but modified by containing a vertical rod 52 attached to the compass card 54; for purposes of illustration only, the card 54 is shown slightly displaced from the horizontal, although it will be understood that the card 54 is normally maintained in the horizontal position. A spherical float 56 is affixed to the rod 52 at its upper end; the float 56 may be made of cork or other material having a density less than the density of the liquid within the compass in order to assist in maintaining the rod 52 in a vertical position at all times. An indicator pointer 58 is fixedly mounted on a shaft 60 which is concentric with the centerline of the dome 46. The shaft 60 leads from the output side of a gear box 62; a bar magnet 66 is attached to the input side of the gear box 62 via a shaft 64. The center 68 of the hemispherical dome 46, the upper portion of the spherical float 56, and the outermost portion of the indicator pointer 58 are all coated with a radioactive phosphor which serves to illuminate the indicated portions so that a film trace of the position of the illuminated elements may be formed at desired times. A reference marker 70 on the compass card 54 and a reference marker 72 on the plexiglass ring 50 are also coated with radioactive phosphor as may be seen in the plan view of the compass illustrated in FIGURE 2. If desired, a serial number which is also coated with radioactive phosphor may be placed on the ring 50 to provide a positive identification of the film taken from a particular recording instrument. The reference marker 72 is located in the plane of the vane 20 (not shown in FIGURE 2) for reasons which will hereinafter appear.

External to the end wall 14 of the instrument case 10 (FIGURE 1) is a rotor 74 journalled in the end wall of the case at its upper end and in an end plate 80 at its lower end. The rotor is mounted on a shaft 76 which contains bearings of the conventional type to allow the rotor to rotate freely about the shaft. The rotor 74 is preferably a Savonius type rotor, and, as such, is known in the art. Standoffs 82 maintain the proper clearance for the rotor 74 between the end wall 14 and the end plate 80. A bar magnet 84, which is magnetically coupled to the bar magnet 66 internal to the case is mounted on the upper end of the rotor, and is concentric with the rotor shaft. The case 10 should be of aluminum or other non-magnetic material in order to allow the highest efficiency for this magnetic coupling. A rod 86 is provided through the outer portion of the upper wall 12 of the case and through the end plate 80 to allow the instrument to be suspended from an underwater cable.

Figure 2:
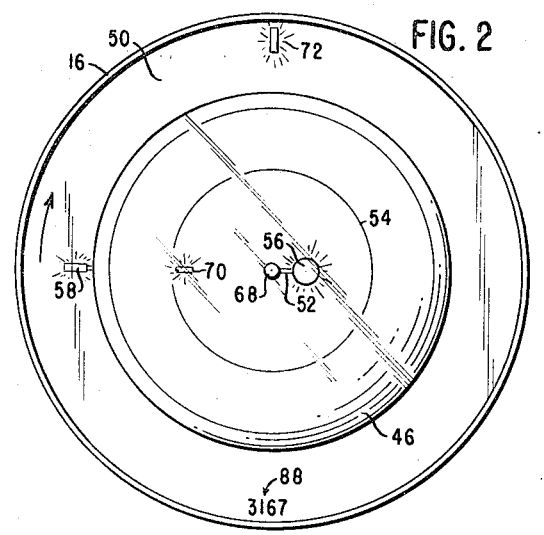
FIGURE 2 is a horizontal section taken along the line 2—2 of FIGURE 1.

The operation of the apparatus shown in FIGURES 1 and 2 is as follows: The clock 40 is first adjusted to provide the desired time interval for the film advance mechanism 38 in order that film records may be made at the desired intervals. Typical settings for the clock 40 would provide an exposure duration of 19 minutes and a film advance rate of one frame every 20 minutes. The instrument case 10 is then attached to a cable by means of the rod 86 and is lowered into the ocean or other body of water whose current speed and current direction are to be measured. If a current is flowing past the instrument case 10, the current will impinge upon the blades of the rotor 74 and cause this rotor to rotate with an angular velocity that is proportional to the linear velocity of the current flowing past the casing. Rotation of the rotor 74 causes the bar magnet 84 attached to the shaft of the rotor to rotate in a corresponding fashion and this rotation is coupled through the end wall 14 of the case to the bar magnet 66 internal to the case. Rotary motion of the bar magnet 66 is transmitted to the gear box 62 which is a reduction-type gear box, and thence to the output shaft 60 and to the current velocity indicator 58. The current speed indicator 58 is rotated around the outer periphery of the compass 44 by the output shaft 60 and the indicator 58 thus traces a circular arc whose centerline is coincident with the centerline of the compass 44. Since the film 36 is exposed to the radiation emanating from the compass 44 and the indicator 58, a film record will be formed of the positions of the pointer 58, the spherical float 56, the compass marker 70, and the reference markers 68 and 72. The length of the arc formed by the indicator 58 will be dependent upon the exposure duration, the gear ratio of the gear box 62, and the sensitivity of the rotor 74. For a typical Savonius rotor having a calibration sensitivity of approximately 80 r.p.m. per knot, a gear reduction ratio of 7200:1 for a 19 minute time exposure will provide an angular trace of approximately 76 degrees per knot. Thus the length of the arc in circular degrees recorded on the film during a given exposure duration will be directly proportional to the current velocity.

The reference marker 70 on the compass card 54 is chosen to correspond with a known magnetic direction, for example, magnetic north. The reference marker 72 on the plexiglass ring 50 is positioned in the plane of the vane 20. Due to the relatively large area of the vane 20, this vane will orient itself, and thus the direction of current flow; thus the reference marker 72 will always lie in a plane that is parallel to the direction of current flow and the angular orientation of this marker with respect to the marker 70 which maintains an orientation that is fixed with respect to a given magnetic heading but whose orientation with respect to the casing 10 varies will provide a direct indication of the angular orientation of the current flow with respect to a fixed compass direction, for example, magnetic north.

Despite the fact that the vane 20 maintains the case 10 substantially in a plane parallel to the direction of current flow, it is possible that the case might be tilted in this plane at some angle to the true vertical. In such a case, the current will not impinge upon the rotor at a right angle thereto and the rotor 74 will sense only the perpendicular component of the current velocity vector, this component being less than the true current velocity vector.

The measured current velocity must thus be corrected by an amount which is proportional to the angular tilt as measured in a plane parallel to the direction of current flow. The rod 52 and float 56 attached to the compass card 54 measure this angle tilt in order that a correction may be applied to the current velocity reading to reflect the true current velocity.

After a given exposure duration, the film is advanced to a new frame and the recording of data is again resumed. If the shutter 28 and shutter control mechanism 42 are utilized in conjunction with the camera, the shutter control mechanism may be programmed to close the shutter during the film advance and to maintain it in a closed condition until it is desired to start the new recording. Alternatively, the film may be advanced at a sufficiently high speed between frames such that the phosphor-coated indicates leave no appreciable trace on the film during the film advance interval.

Figure 3:
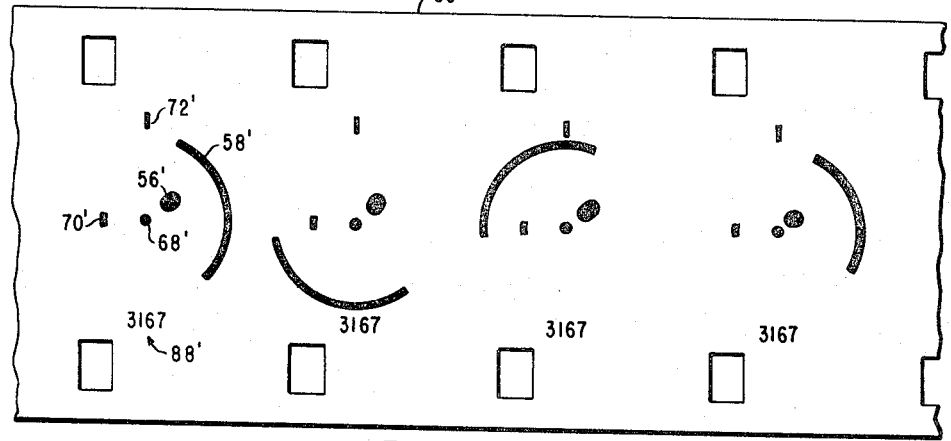
FIGURE 3 illustrates a portion of the film record generated by the apparatus of our invention, the film containing four frames.

FIGURE 3 illustrates a portion of a film record generated by the camera and the data sensors and containing four frames. The record shown was taken with an exposure duration of 19 minutes/frame, and the film was advanced to a new frame every 20 minutes. The primed numerals in the film record indicate the film traces formed by the corresponding phosphor-coated elements bearing unprimed numerals in FIGURE 2.

As shown therein, the compass card reference marker 70 made only slight excursions with respect to the current direction reference marker 72, thus indicating that the current direction remained substantially constant during the exposure direction and was generally oriented in a direction approximately 90° east of the reference marker 70. During this interval, the spherical float 56 generated a film trace 56' which varied only slightly in direction and amplitude, thus indicating that the case 10 maintained a nearly constant orientation with respect to the current. During this same exposure duration, however, the current velocity indicator pointer 58 generated an arc 58' of substantial length. Reading from left to right in FIGURE 3, it will be seen that the angular length of the arc 58' in circular degrees is approximately 115, 120, 117, and 92 degrees respectively. If the current velocity indicator is calibrated to provide an arc of 76° per knot, it will be seen that these angular readings correspond to 1.52, 1.58, 1.54, and 1.21 knots respectively, thus indicating that the current velocity is passing through a peak during the exposure durations indicated.

As so far described, it will be seen that the apparatus of our invention generates a time amplitude record or histogram of the output of a plurality of data sensors over a given exposure duration; for the example shown in FIGURE 3, this exposure duration was approximately 19 minutes. A single frame of the film is thus seen to provide a direct measurement of the amplitude limits through which the mechanical output indicators of the data sensors have moved in the given time interval, as well as indicating the direction of motion where appropriate. Additional information concerning the time behavior of the data sensors can be obtained by employing in conjunction with the apparatus of our invention a film which has a linear exposure density/exposure time relationship over the interval during which the film is to be exposed. Thus, a Double-X negative 16 mm. movie film may be employed which has a substantially linear response to exposure over an exposure duration from 5 seconds to 19 minutes.

When film of this type is used, the density of a given film trace will provide an indication of the length of time during which the output indicators of the data sensors were positioned over a given portion of film. At a rotor calibration of 76° per knot and with an exposure duration of 19 minutes, a current of one knot will cause the current speed indicator to sweep through an arc of 4° each minute at a speed of one knot. If the width of the phosphor coated section of the current speed indicator is made equal to 4°, it will be seen that each 4° segment of the film trace will be exposed to the indicator for a period of one minute. If the current speed were to double at some portion along the arc, each 4° segment in this area of increased speed would be exposed for a time interval that is one half the previous time interval, that is, for a time interval of 30 seconds. Since the exposure time is directly related to the film density of the exposed film, it will be seen that the density of the film along any given portion of the arc will provide a direct indication of the current speed as the speed indicator sweeps through that portion of the arc. Thus, in cases in which the current speed is substantially constant during the exposure duration, the current speed may be read directly from the length of the arc. On the other hand, in cases in which the current speed varies during the exposure duration, the current speed at various times during the exposure duration may be read by measuring the density at selected portions along the arc. Thus, by using film which is linearly responsive to the exposure duration, the current speed is made a function of both the length of the trace formed by the speed indicator and the exposure duration/exposure density factor, instead of merely the length of the film trace as was previously the case.

In certain instances, it may be found desirable to break the continuous speed trace 58' shown in FIGURE 3 into short, discrete segments. This may be accomplished by using the shutter 28 and the shutter control mechanism 42 previously described. In such a case, the film will be exposed to the indicators only for the interval during which the shutter is maintained open by the shutter control mechanism. The shutter and its associated shutter control mechanism may also advantageously be used when it is desired to form film recordings at extended time intervals or with short exposure durations.

Although we have illustrated and described our recording apparatus with particular reference to oceanographic instruments and particularly current speed and current direction meters, it will be apparent to those skilled in the art that our invention is not so limited and may readily be employed in a wide variety of other applications in which it is desired to generate a time-amplitude record of the amplitude and direction of motion of the mechanical output indicators of data sensors. Further, it will be seen that in situations in which only the amplitude limits of the excursions of the mechanical output indicators is desired, the film used in my apparatus need not possess a linear relationship between exposure duration and the density of the exposed portions of the film. On the other hand, if it is desired to measure not only the amplitude limits of the excursions but also the length of time the mechanical indicators occupied given positions, a film possessing the linear relationship will be used.

From the above, it may be seen that we have provided a simple yet efficient apparatus for generating time-amplitude records of data sensors in which continuous records of the output indicators of the sensors are desired during a substantially long time interval. We have also provided a recording apparatus of relatively small dimensions in which a large quantity of information can be recorded on a single frame of film. Further, we have provided an improved recording apparatus which is particularly useful in recording the outputs of data sensors in oceanographic instruments which measure data variables which have a relatively slow rate of variation over an extended period of time. In addition, we have provided improved current direction and current speed meters which are particularly adapted to utilize the recording apparatus of our invention.

It will thus be seen that the objects set forth above, among those made apparent from the preceding description, are efficiently attained and, since certain changes may be made in the above constructions without departing from the scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

Having described our invention, we claim:
1. An instrument for providing a histographic film record of the output of at least one data sensor having an indicating member capable of mechanical movement comprising, in combination,
   an instrument case,
   means mounting a camera within said case,
   a supply of radiation-sensitive film mounted within said camera,
   timing means for advancing said film into exposing position within said camera at selected times and maintaining each said position for an exposure duration substantially greater than that required to form an image on the film,
   means for advancing the film to an unexposed portion thereof after each exposure,
   means mounting said indicating member within the field of view of the camera,
   and means for rendering said indicating member radiative, said exposure duration being such that motion of said member within said exposure duration is recorded as an extension of the image of said radiative member, whereby a photographic record of the movement of said member during the exposure duration may be formed on the film.

2. The combination defined in claim 1 in which said film possesses a linear relationship between exposure duration and film density whereby the length of time during which said indicating member occupies a given position may be determined from the density of the corresponding film trace.

3. An instrument for providing a histographic film record of the output of at least one data sensor having an indicating member capable of mechanical movement comprising, in combination,
   an instrument case,
   means mounting a camera within said case,
   a supply of radiation-sensitive film mounted within said camera,
   timing means for advancing said film into exposing position within said camera at selected times and maintaining each said position for an exposure duration substantially greater than that required to form an image on the film,
   means for advancing the film to an unexposed portion thereof after each exposure,
   means mounting said indicating member within the field of view of the camera,
   means for rendering said indicating member radiative whereby a photographic record of the movement of said member during the exposure duration may be formed on the film, said data sensor including a current speed sensor to measure the speed of the current in the vicinity of the instrument case, said sensor comprising, in combination,
   a rotor mounted external to said case for rotation at an angular velocity proportional to the current speed,
   a current speed indicating member mounted internal to said case for angular rotation about an axis perpendicular to the focal plane of said camera, said indicator having means for rendering a portion thereof, radiative,
   and means coupling the rotary motion of said rotor to said indicating member.

4. The combination defined in claim 3 in which said coupling means comprises a first magnet rigidly attached to said rotor external to said case for rotary motion with said rotor,
   a second magnet internal to said case and in magnetic coupling relationship with said first magnet, the rotary motion of said first magnet being coupled to said second magnet, gear-type reduction means connected to said second magnet, and means interconnecting said reduction means and said current speed indicating means, whereby said indicating means rotates about said axis with an angular velocity proportional to the angular velocity of said rotor.

5. The combination defined in claim 3 which includes tilt angle indicating means comprising in combination, a magnetic compass mounted within said case and having a horizontal-seeking, magnetic-north-seeking compass member, an upright, elongated tilt-angle indicating member affixed to said compass member at substantially a right angle thereto, and a reference marker affixed to said compass, said marker being substantially colinear with said upright indicating member when said compass-member is in the horizontal position, said marker and said upright member having radiative means associated therewith whereby the displacement between said member and said marker may be recorded on said film to provide an indication of the deviation of said case and said rotor from an upright position.

6. The combination defined in claim 3 in which said film possesses a linear relationship between exposure duration and film density whereby the length of time during which said indicating member occupies a given position may be determined from the density of the corresponding film trace.

7. The combination defined in claim 6 which includes tilt angle indicating means comprising in combination a magnetic compass mounted within said case and having a horizontal-seeking, magnetic-north-seeking compass member, an upright, elongated tilt-angle indicating member affixed to said compass member at substantially a right angle thereto, and a reference marker affixed to said compass, said marker being substantially colinear with said upright indicating member when said compass-member is in the horizontal position, said marker and said upright member having radiative means associated therewith whereby the displacement between said member and said marker may be recorded on said film to provide an indication of the deviation of said case and said rotor from an upright position.

8. An instrument for providing a histographic film record of the output of at least one data sensor having an indicating member capable of mechanical movement comprising, in combination, an instrument case, means mounting a camera within said case, a supply of radiation-sensitive film mounted within said camera, timing means for advancing said film into exposing position within said camera at selected times and maintaining each said position for an exposure duration substantially greater than that required to form an image on the film, means for advancing the film to an unexposed portion thereof after each exposure, means mounting said indicating member within the field of view of the camera, and means for rendering said indicating member radiative whereby a photographic record of the movement of said member during the exposure duration may be formed on the film, and including current direction indicating means comprising, in combination, a magetic compass mounted within said case and having a magnetic-north-seeking compass member, a flat vane mounted external to said case and fixedly attached thereto, said vane having a surface area sufficient to maintain said vane and said case in a plane substantially parallel to the direction of current flow, a first current direction marker fixed internal to said case, a second current direction marker fixed to said compass member, the relative angular orientation between said first and second markers providing an indication of the orientation of the vane with respect to a given magnetic heading, and means for rendering said first and second markers radiative whereby the positions of said markers during the exposure duration may be recorded on said film.

9. The combination defined in claim 8 which includes a current speed sensor to measure the speed of the current in the vicinity of the instrument case, said sensor comprising, in combination, a rotor mounted external to said case for rotation at an angular velocity proportion to the current speed, a current speed indicating member mounted internal to said case for angular rotation about an axis perpendicular to the focal plane of said camera, said indicator having means for irradiating a portion thereof, and means coupling the rotary motion of said rotor to said indicating member.

10. The combination defined in claim 9 wherein said compass member is a horizontal-seeking, magnetic-north-seeking member and including a tilt angle indicating means comprising, in combination, a magnetic compass mounted within said case and having a horizontal-seeking, magnetic-north-seeking compass member, an upright, elongated tilt-angle indicating member affixed to said compass member at substantially a right angle thereto, and a reference marker affixed to said compass, said marker being substantially colinear with said upright indicating member when said compass-member is in the horizontal position, said marker and said upright member having radiative means associated therewith whereby the displacement between said member and said marker may be recorded on said film to provide an indication of the deviation of said case and said rotor from an upright position.

11. The combination defined in claim 10 in which said film possesses a linear relationship between exposure duration and film density whereby the length of time during which said indicating member occupies a given position may be determined from the density of the corresponding film trace.

12. A current direction meter and recording instrument for indicating the direction of current flow in the vicinity of said meter and recording said direction on photographic film comprising, in combination, an instrument case having a camera mounted therein, a magnetic compass mounted within said case having a horizontal-seeking, magnetic-north-seeking compass member, a flat vane mounted external to said case and fixedly attached thereto, said vane having a surface area sufficient to maintain said vane and said case in a plane substantially parallel to the direction of current flow, a first current direction marker fixed internal to said case, a second current direction marker fixed to said compass member, the relative angular orientation between said first and second markers providing an indication of the orientation of the vane with respect to a given magnetic heading, and means for rendering said first and second markers radiative whereby the positions of said markers during the exposure duration may be recorded on said film.

13. A current speed meter and recording instrument for indicating the speed of the current in the vicinity of said meter and recording said speed on photographic film comprising in combination, an instrument case,
a rotor mounted external to said case for rotation at an angular velocity proportional to the current speed,
a current speed indicating member mounted internal to said case for angular rotation, said indicator having means for rendering a portion thereof radiative,
means coupling the rotary motion of said rotor to said indicating member,
and camera means for exposing film to the radiations from said indicating member for a predetermined time period such that the length of irradiated track on said film is indicative of current speed in the vicinity of said instrument case.

References Cited

UNITED STATES PATENTS

| | | | |
|---|---|---|---|
| 1,865,373 | 6/1932 | Idrac | 73—189 |
| 2,413,005 | 12/1946 | Smith | 33—205.5 |
| 2,649,712 | 8/1953 | Dale | 73—231 X |
| 3,100,350 | 8/1963 | Brown | 33—205.5 |
| 3,183,717 | 5/1965 | Brainard | 346—107 X |

RICHARD B. WILKINSON, *Primary Examiner.*

J. W. HARTARY, *Assistant Examiner.*